United States Patent
Schleussner

(10) Patent No.: US 6,720,030 B2
(45) Date of Patent: Apr. 13, 2004

(54) ELECTRICALLY CONDUCTING PRINTED WEBS OF PLASTIC

(75) Inventor: Martin Schleussner, Köln (DE)

(73) Assignee: Technoplast Beschichtungsgesellschaft, Köln (DE)

( * ) Notice: Subject to any disclaimer, the term of this patent is extended or adjusted under 35 U.S.C. 154(b) by 138 days.

(21) Appl. No.: 09/956,107

(22) Filed: Sep. 20, 2001

(65) Prior Publication Data

US 2002/0015830 A1 Feb. 7, 2002

Related U.S. Application Data

(62) Division of application No. 09/403,760, filed as application No. PCT/EP98/02564 on Apr. 30, 1998, now Pat. No. 6,368,209.

(30) Foreign Application Priority Data

May 3, 1997 (DE) .......................................... 197 18 859

(51) Int. Cl.[7] .................................................. B05D 1/36
(52) U.S. Cl. ........................ 427/203; 427/196; 427/214; 427/258; 427/404; 427/428; 427/429; 427/430.1
(58) Field of Search ................................. 427/196, 203, 427/205, 214, 217, 250, 258, 328, 367, 404, 428, 429, 430.1

(56) References Cited

U.S. PATENT DOCUMENTS 5,310,640 A 5/1994 Markin et al.

FOREIGN PATENT DOCUMENTS

EP 0 402 260 * 12/1990

* cited by examiner

*Primary Examiner*—Merrick Dixon
(74) *Attorney, Agent, or Firm*—Jacobson Holman PLLC

(57) ABSTRACT

Electrically conducting printable webs of plastic having upper and lower sides, at least one of said sides being provided with a primer layer for printing pretreatment, comprising a substance selected from the group consisting of polyurethanes, acrylates, polyester resins with isocyanates or combinations thereof, on which another layer containing an electrically conducting organic polymer is coated.

7 Claims, No Drawings

ELECTRICALLY CONDUCTING PRINTED WEBS OF PLASTIC

This is a Divisional of Ser. No. 09/403,760, filed Jan. 3, 2000, now U.S. Pat. No. 6,368, 209 which in turn is a 371 of PCT/EP98/02564, filed Apr. 30, 1998, the disclosures of which are incorporated herein by reference.

The present invention relates to electrically conducting printable webs of plastic, processes for the preparation of electrically conducting printable webs of plastic, and a binder by means of which electrically conducting organic polymers can be applied to plastic sheets.

For reasons of explosion protection and electromagnetic shielding and due to the increased demand for electroluminescent displays, LCDs and touch screens, electrically conducting surfaces are increasingly gaining importance because they can prevent electrostatic charging. The focus of interest is shifting more and more to electrically conducting plastic surfaces.

The conventionally used plastics have a high resistance which may be in the range of $10^{15}$ Ohm/□. In order to increase the conductivity of plastics, especially of plastic sheets, metallic screen printing inks, carbon paints or wire gauze are used. However, if transparent surfaces are required, this is not possible since the surface would be no longer transparent eventually.

Therefore, to prepare transparent, electrically conducting surfaces, plastic sheets are sputtered with metal oxide layers in an expensive process under ultrahigh vacuum. Usually, indium tin oxide (ITO) is used for this purpose.

However, these sputtered layers cannot be printed afterwards since the printing inks fail to adhere to the metal oxide layer satisfactorily. On the other hand, if layers already printed are to be sputtered, there is a risk that volatile components of the printing inks are vaporized in the ultrahigh vacuum necessary for sputtering.

Due to the use of ultrahigh vacuum, sputtering processes are very expensive. Further, sputtered layers exhibit a change in resistance upon mechanical and/or thermal deformation of the surface.

The use of the heavy metal oxides in sputtered layers involves a danger for humans and the environment both in production and in application.

The object of the invention has been to provide electrically conductive plastic surfaces which can be printed on with a particularly good adhesion and have improved surface properties, and processes for the preparation of such plastic surfaces in which the use of ultrahigh vacuum and heavy metals is eliminated.

Surprisingly, the object of the invention is achieved by electrically conducting printable webs of plastic having the features of claim 1, by preferred embodiments according to claims 2 to 6, electrically conducting printed webs according to claim 7, a preparation process according to claim 9, and the use of the electrically conducting printable webs of plastic according to claim 14. Claims 10 to 13 are preferred embodiments of the process.

The electrically conducting printable webs of plastic according to the invention have upper and lower sides, at least one of said sides being provided with a primer layer for printing pretreatment, comprising a substance selected from the group consisting of polyurethanes, acrylates, polyester resins with isocyanates or combinations thereof, on which another layer containing an electrically conducting organic polymer is coated.

These plastic webs are advantageous, in particular, when an electrically conducting surface is needed for reasons of explosion protection or electromagnetic shielding, or for printing with electroluminescent pastes. In addition, these plastic webs do not exhibit a significant change in resistivity upon being deformed.

Preferably, the plastic webs are made of polyethylene, polycarbonate, polyacrylate, polyester, polypropylene, poly (vinyl chloride) or copolymers thereof.

The primer layer for the electrically conducting printable webs of plastic are formed by a primer made of polyurethanes, acrylates, polyester resins with isocyanates. Particularly preferred components of the primer are acrylate copolymers of the Neocryl series of Polyvinyl-Chemie Holland N.V. (Neocryl XK90, XK11, BT26, A-1052), Halloflex 202 available from ICI (vinyl acrylate copolymer), Neopac E-130 (polyurethane-acrylic copolymer), Viclan VL805 (PVDC), Dynapol L206 (polyester), Elecond PQ50B (acrylate), Alberdingk APU1060 and U910 (polyethylene-polyurethane copolymers), Saran F-310 (PVDC), Alberdingk APU1014, Aquacote 287/4 (styrene acrylate), Neorez R-970, R-973, R-974, R-986, R-940, R-970, R-972, optionally together with Xama (tris(N-aceridinyl)ethane), poly(oxy-p-phenylenesulfonyl-p-phenylene) of the PES series available from Deutsche ICI GmbH (PES 2000, PES 124G, PES 124S, PES 215G), Vylon 103, Vylon 240, Pioloform BL 18, PolyDisB/300LF, Plexigum M890, Vital PE-2200, Ucar Vinyl VMCH, Melinex 525, NeocXK11, NeocA1052, Cariflex TR1102, Clarene R-20 and Clarene L-6. The primer layer serves as a printing pretreatment and mediates the adhesion of the inks, paints, pastes or the like, applicable by various printing methods, which would otherwise perhaps not exhibit sufficient adhesion on the plastic webs, especially when deformed.

In this connection, a good adhesion means that the printed electrically conducting webs of plastic according to the invention will achieve a GT value of between 0 and 3, preferably between 0 and 2, especially between 0 and 1, in a cross-hatch adhesion test according to DIN 53 151 or ASTM D 3002 or ASTM D 3359.

The GT value indicates how strongly a printed structure or the like adheres to the surface. GT values are a measure for the adhesion of the printed structure to the surface and range from 0 to 5. A value of 5 indicates that an almost complete removal of the printed structure has occurred in the test whereas a GT value of 0 means that no printed structure has been removed. Thus, low GT values mean a good adhesion of the printed structure to the surface.

As said electrically conducting organic polymer, there are used, in particular, polyamidines, polyacetylenes, polypyrroles, polythiophenes, free-radical containing salts and combinations thereof. Suitable materials include N-n-propyl-iquinolinium, available as OS-CON from Sanyo (Japan), polyanilines available under the designation Incoblend from Zipperling-Kessler (Germany), polythiophenes available under the trade name Hostaphan RN 12 from Hoechst (Germany), polyanilines available under the designation CP EX-1 available from Hexcel (USA), and the products of Ciba-Geigy (Switzerland) available under the designation TEC.

"Free-radical containing salts" means those compounds, in particular, in which a plastic material has been converted to a free-radical containing state by doping, for example, with $Br_2$ or $I_2$.

The layer containing the electrically conducting organic polymer optionally contains a binder whereby the adhesion to the primer layer can be improved. In particular, the ratio of electrically conducting organic polymer to binder can be varied in such a way, that besides very small resistances, resistances in the range around $10^6$ Ohm/□ having antistatic properties can also be achieved.

It is advantageous to use transparent polymers because mechanically and thermally deformable, transparent, printable, electrically conducting plastic webs are thus obtained which have not been available to date in this form.

It is particularly advantageous to use the plastic web according to the invention in the fields where transparency of the plastic surface is necessary, for example, as a display in electronic equipment.

These printable webs of plastic can be printed or coated with, for example, printing inks, paints, hard lacquers, electroluminescent screen printing pastes or liquid crystals. In addition, the printing and/or coating can be effected on both sides irrespective of whether the layer containing the electrically conducting organic polymer is applied on one or both sides.

As the binders for applying the electrically conducting organic polymer, artificial resins or artificial-resin-like substances, such as poly(vinyl chloride) latexes, poly (methyl methacrylate) latexes, polyurethane dispersion, poly (vinyl acetate) or poly(vinyl alcohol), are particularly suitable.

The process according to the invention for the preparation of electrically conducting printable webs of plastic involves the application of a primer to form a primer layer for printing pretreatment, and the application of another layer containing an electrically conducting organic polymer.

The process is characterized, in particular, by the application of the conductive coating under normal pressure and by the avoidance of heavy metals.

Particularly suitable are methods in which the primers forming the primer layer are applied by coating techniques such as reverse roll, knife or gravure coating.

For applying the conductive organic polymer, in particular, aqueous or organic solutions or mixtures thereof are suitable, wherein alcohols, ketones, heterocycles or combinations thereof, in particular, are suitable as solvents for the solution. Optionally, the polymer is applied together with a binder.

The structure of the plastic web according to the invention and its preparation are illustrated in the following Examples.

EXAMPLE 1

A biaxially drawn Mylar A type polyester sheet (DuPont) is coated with an acrylate primer diluted in acetone by a reverse roll method. The subsequent drying is performed at 100° C., at a web speed of 3 m/min and a dryer length of 4 m. Onto the primer layer thus obtained, an aqueous solution comprising 180 g of Baytron P (1.3% polyethylenedioxythiophenepolystyrenesulfonate), 15.4 g of Impranil 85 UD, 6.5 g of N-methylpyrrolidone, 39.0 g of isopropanol, 2.1 g of epoxysilane A 187 and 16 g of sorbitol (30% in $H_2O$) is coated, also by a reverse-roll method. The drying is performed at 115° C. in a dryer having a length of 4 m at a speed of 5 m/min, followed by a protective printing based on polyacrylate under UV irradiation of 800 mJ/cm² in a screen-printing method (100 mesh T screen).

EXAMPLE 2

Solvent-containing or aqueous formulations containing conductive organic polymers are coated onto 250 μm polycarbonate sheet (Lexan) using a knife-coating method with subsequent multiroll drying.

The knife-coating method is characterized by a deposition of excess coating solution which is dosed to the intended coating quantity by a #50 wire knife coater.

The coating rate is 10 m/min.

In a subsequent multizone drying process, the conductive polymer layer is dried (2 m length, 10 m/min) at a temperature of 120° C. in the first drying segment (2 m length) and of 130° C. in the second drying segment. The sheet thus obtained (resistance 104–105 Ω/□) is printed with Marastar ink (Marabu).

EXAMPLE 3

A layer containing a conductive organic polymer and having a resistance of about 3000 Ω/□ is bonded to PET with a good adhesion and is printable with solvent-based screen-printing methods. The structure for electroluminescence is as follows.

1. base (PET Mylar, Melinex or polycarbonate (Lexan), 250 μl);
2. conductive layer (by analogy with Example 1 or 2);
3. electroluminescent layer (e.g., 7151 E, DuPont), drying at 120° C. (air drying, 5 min in furnace);
4. second insulation paint layer (e.g., 7153 E, DuPont), drying at 120° C. (air drying);
5. silver conductive paint (e.g., 7145 L, DuPont), drying at 120° C. (air drying in furnace).

Contacting after drying, drying 110 V, 400 Hz.

EXAMPLE 4

A 3000 Ω/□ sheet prepared as in Example 3 was printed with DuPont pastes according to directions (Luxprint), also, embossed to a depth of 4 mm, male mold 70° C., female mold room temperature (25° C.).

A polyester sheet, sputtered with ITO (100 Ω/□), was subjected to the same printing and embossing procedures. Both were subjected to a lifting test (Böck tester, 5 N sensor). With the ITO sheet, rupture occurred after about 100 lifts (dimming of the EL lamp over the print). The 3000 Ω/□ sheet of the invention exhibited its complete illuminating power even after 1.7 million lifts.

EXAMPLE 5

A polyester sheet (Mylar D, 175 μm) was coated with a conductive polymer according to the above mentioned formulation. A 175 μm Mylar D was also treated with the above mentioned primer and then provided with a conductive formulation under the same conditions as the untreated Mylar D base. Both samples were printed with a screen-printing ink of Marabu, Marastar SR (100 mesh T screen, drying 2 min at 70° C.). Then, a cross-hatch adhesion test according to DIN 53 151 or ASTM D 3002 was performed. The printing of the polyester which had only been treated with the conductive polymer resulted in a GT of 4 to 5 (almost complete breaking off) whereas good to very good adhesion values (GT 0 to 1) were achieved by the additional primer coating.

What is claimed is:

1. A process for the preparation of an electrically conducting, printable, plastic surface comprising
   applying a primer to at least one of upper and lower sides of a plastic web to form a primer layer, the primer comprising a substance selected from the group consisting of polyurethanes, acrylates, polyester resins with isocyanates, and combinations thereof, and
   applying a coating on the primer layer to form a coating layer, the coating comprising, in the absence of heavy metals, an electrically conducting organic polymer.

2. The process according to claim 1, characterized in that applying the primer layer is performed by a by coating technique selected from the group consisting of reverse roll coating, knife coating, and gravure coating.

3. The process according to claim 1, characterized in that the coating comprises the electrically conducting organic polymer in a solution selected from the group consisting of an aqueous solution, an organic-solvent solution, and mixtures thereof.

4. The process according to claim 3, characterized in that the solution is the organic-solvent solution.

5. The process according to claim 4, characterized in that the organic solvent is selected from the group of alcohols, ketones, heterocycles, and combinations thereof.

6. The process according to claim 1, characterized in that the coating further comprises a binder.

7. A method of making an electrically conducting, printed, plastic surface comprising forming a printed image on an electrically conducting, printable, plastic web prepared by a process comprising applying a primer to at least one of upper and lower sides of a plastic web to form a primer layer, the primer comprising a substance selected from the group consisting of polyurethanes, acrylates, polyester resins with isocyanates, and combinations thereof, and applying a coating on the primer layer to form a coating layer, the coating comprising, in the absence of heavy metals, an electrically conducting organic polymer.

* * * * *